(12) United States Patent
Uyttenboogaart

(10) Patent No.: US 7,503,367 B2
(45) Date of Patent: Mar. 17, 2009

(54) BELT AND TREAD DRUM

(75) Inventor: Paul Richard Uyttenboogaart, Xg Vaassen (NL)

(73) Assignee: VMI Epe Holland B.V., Epe (NL)

( * ) Notice: Subject to any disclaimer, the term of this patent is extended or adjusted under 35 U.S.C. 154(b) by 499 days.

(21) Appl. No.: 10/535,751

(22) PCT Filed: Nov. 19, 2003

(86) PCT No.: PCT/NL03/00814

§ 371 (c)(1), (2), (4) Date: Dec. 5, 2005

(87) PCT Pub. No.: WO2004/045839

PCT Pub. Date: Jun. 3, 2004

(65) Prior Publication Data

US 2006/0127519 A1    Jun. 15, 2006

(30) Foreign Application Priority Data

Nov. 20, 2002    (NL) .................................... 1021958

(51) Int. Cl.
  *B29D 30/24* (2006.01)
  *B29D 30/26* (2006.01)
(52) U.S. Cl. .......................................... 156/414; 492/8
(58) Field of Classification Search ......... 156/414–420; 492/8; 310/156.09–156.13, 156.19; 335/306
  See application file for complete search history.

(56) References Cited

U.S. PATENT DOCUMENTS

| | | | | |
|---|---|---|---|---|
| 3,721,189 A | * | 3/1973 | Bray | ........................... 335/306 |
| 4,923,554 A | | 5/1990 | Ozawa | |
| 5,066,354 A | | 11/1991 | Benjamin | |
| 5,938,579 A | * | 8/1999 | Cavazos | .......................... 492/8 |
| 6,150,746 A | * | 11/2000 | Lechner | ....................... 310/181 |
| 6,548,932 B1 | * | 4/2003 | Weiglhofer et al. | .... 310/156.19 |
| 6,603,232 B2 | * | 8/2003 | Van Dine et al. | ....... 310/156.01 |

FOREIGN PATENT DOCUMENTS

| | | |
|---|---|---|
| DE | 11 75 870 | 8/1964 |
| JP | 08-065929 | 3/1996 |
| JP | 10-191586 | 7/1998 |
| JP | 2002-361758 | 12/2002 |

OTHER PUBLICATIONS

Machine translation for JP 2002-361758, Dec. 28, 2002.*
Patent Abstracts of Japan of JP 2002-2361758 dated Dec. 18, 2002.
Patent Abstracts of Japan of JP 10-191586 dated Jul. 21, 1998.
Patent Abstracts of Japan of JP 08-065929 dated Mar. 8, 1996.

* cited by examiner

*Primary Examiner*—Geoffrey L Knable
(74) *Attorney, Agent, or Firm*—Ladas & Parry LLP

(57) ABSTRACT

Belt and tread drum (1), particularly for shaping a belt layer and/or tread layer or another tire component provided with metal parts into a circumferential whole, comprising one or more support members (4) arranged at the circumference of the drum, which are provided with a support surface for the tire component, wherein the support members comprise magnet sets having magnets (7a, 7b) for by magnetically attracting the metal parts retaining the tire component on the support surface, wherein the magnet sets comprise holders (8a, 8b) for the magnets and are placed from the radial inside in the support members, wherein the drum at the circumferential side comprises first portions that engage over the holders in tangential and/or axial direction of the drum, wherein the drum at the circumferential side comprises second portions that engage over the magnets in tangential and/or axial direction of the drum.

9 Claims, 2 Drawing Sheets

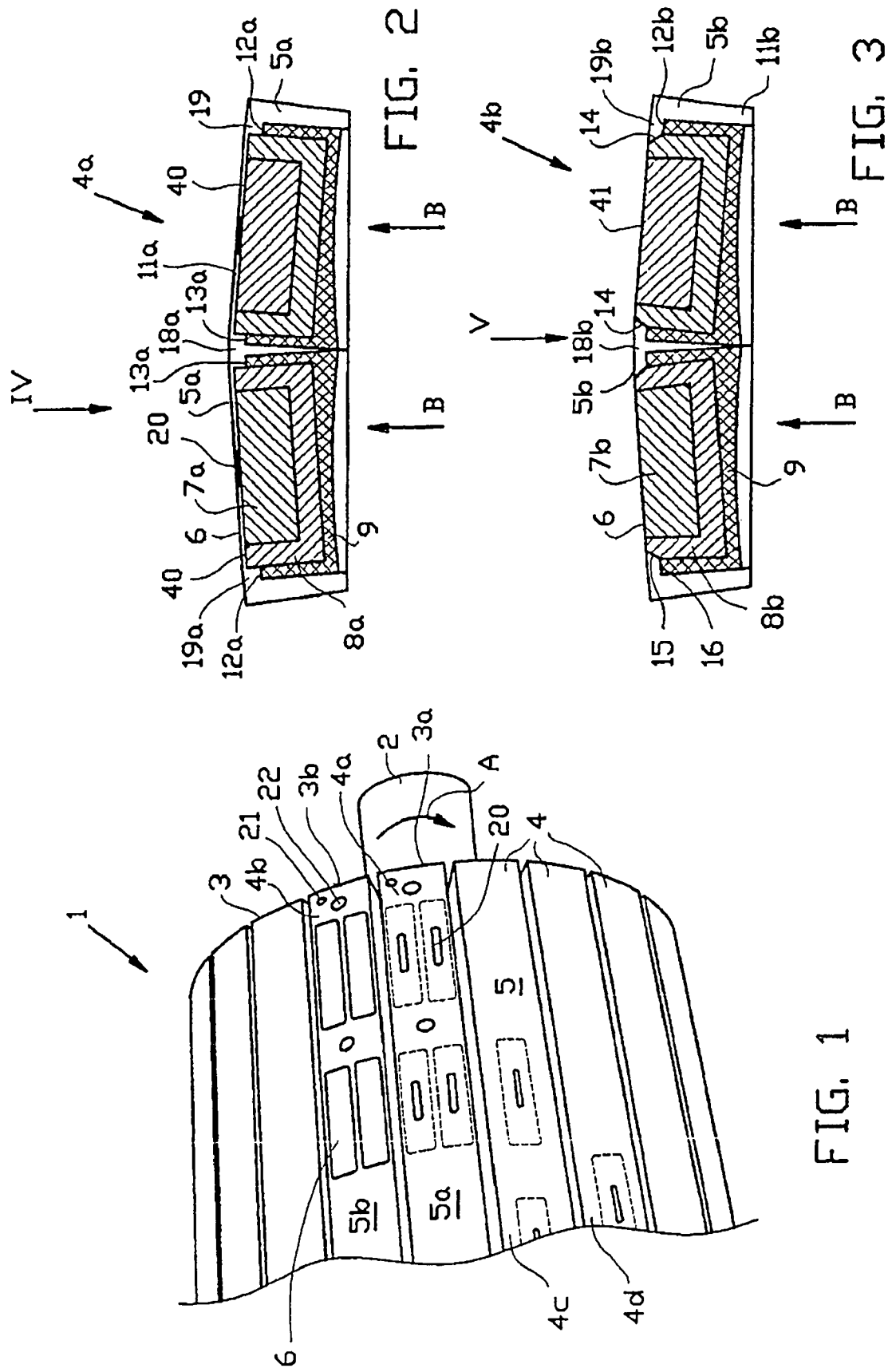

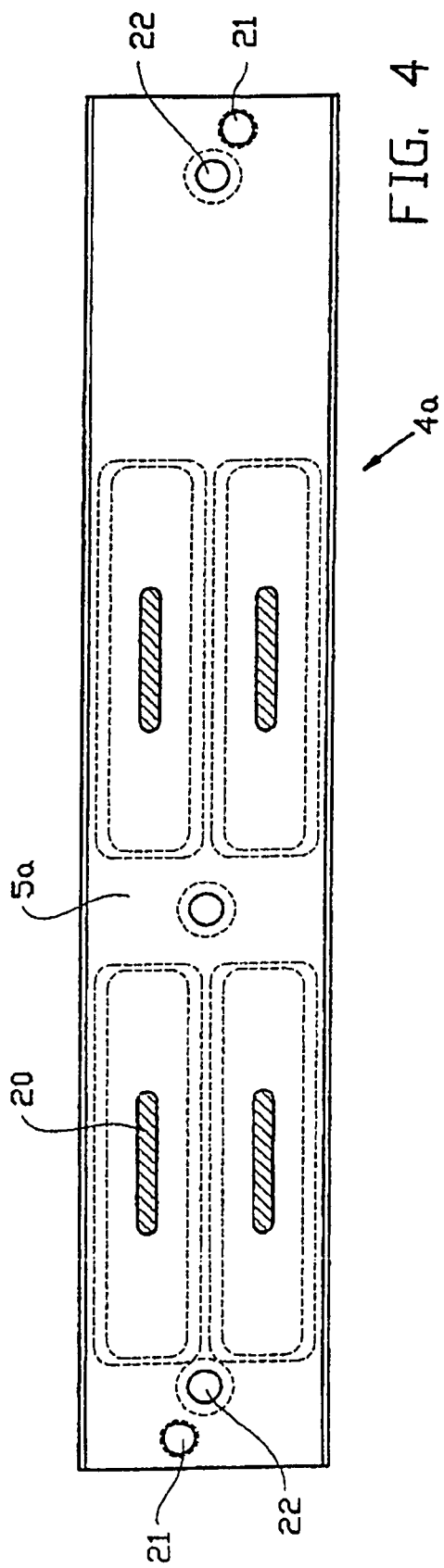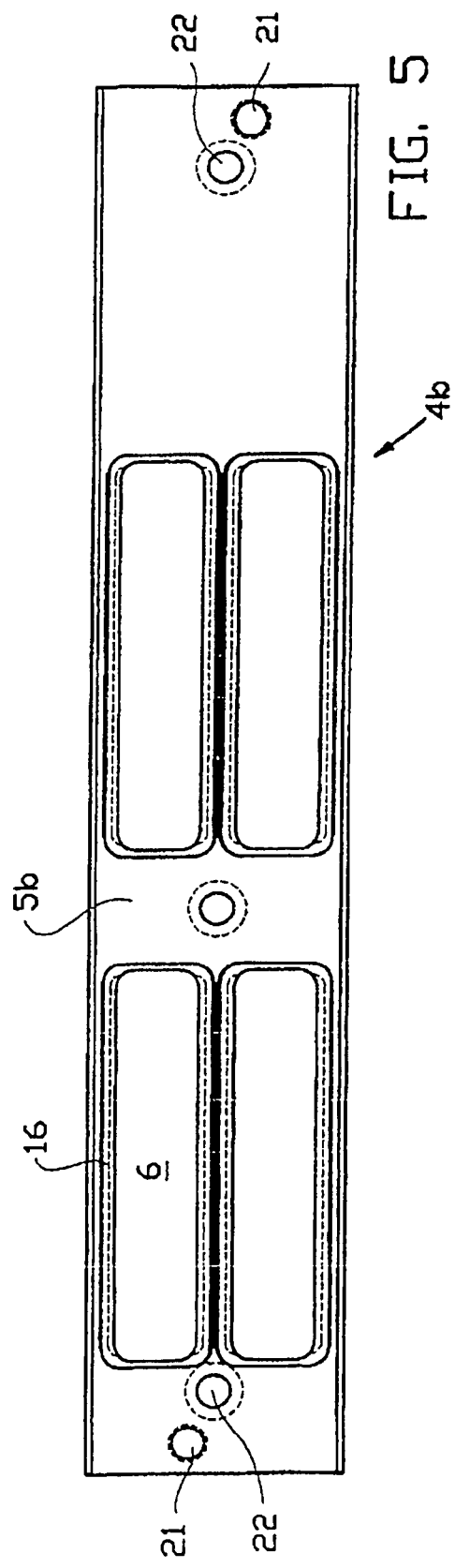

BELT AND TREAD DRUM

BACKGROUND OF THE INVENTION

The invention relates to a belt and tread drum. The invention particularly relates to a drum on which a belt layer and a tread layer can be arranged to be shaped into a circumferential whole.

Known are belt and tread drums that are provided with magnets in order to retain the tyre component on the drum surface by magnetic influence on the metal parts, such as steel wires, incorporated in said tyre component arranged on the drum. The drum surface is defined by a series of parallel, elongated support members that are each provided with a number of magnets. The support members are separately attached on the drum and at the radial outside provided with elongated recesses, in which the magnets are accommodated with the intermediary of a tray-shaped steel holder. The magnet is glued in the holder and the holder is glued in the recess.

In operation such belt and tread drums are rotated at high speed, which results in considerable centrifugal forces on the holders and the magnets. As a result of a faulty glue connection, which may or may not be due to wear/fatigue, it may happen that a magnet, possibly including the holder, drops out of the drum or is slung from the drum. This is a big safety hazard.

It is an object of the invention to improve on this.

SUMMARY OF THE INVENTION

From one aspect the invention to that end provides a belt and tread drum, particularly for shaping a belt layer and/or tread layer or another tyre component provided with metal parts into a circumferential whole, comprising one or more support members arranged at the circumference of the drum, which are provided with a support surface for the tyre component, wherein the support members comprise magnet sets having magnets for by magnetically attracting the metal parts retaining the tyre component on the support surface, wherein the magnet sets comprise holders for the magnets and are placed from the radial inside in the support members, wherein the drum at the circumferential side comprises first portions that engage over the holders in tangential and/or axial direction of the drum, wherein the drum at the circumferential side comprises second portions that engage over the magnets in tangential and/or axial direction of the drum.

In comparison to the known belt and tread drum discussed above, the magnet sets are arranged in the support members from the inner side that is opposite the support surface. As a result the magnets are stopped in radial outward direction so that they cannot inadvertently get detached from the drum. The preferably tray-shaped holders are thus also stopped radially to the outside in a simple and reliable manner.

It is noted that from U.S. Pat No. 4,923,554 a belt drum is known, wherein the support members are radially expandable in order to increase the diameter of the drum, wherein cover plates are attached on the support members, which extend in circumferential direction of the support member in question in order to cover the intermediate space between the support members in the radially expanded positions. The cover plates form support surfaces and cover the elongated recesses in the underlying part of the support members, which recesses open radially to the outside. In said recesses magnets attached on plates are arranged from the radial outside.

The first portions and/or second portions of the drum may be part of the support surfaces, so that a simple structure is achieved.

The first portions or the support surfaces may extend over the entire surface of the magnets. This does not only result in a further simplified structure, but the support surface is question also provides a support surface that continues over the magnets.

In a simple easy-to-assemble and highly user-safe embodiment the support surfaces are formed as one unity with the support members.

The second portions may, alternatively or additionally to the support surfaces formed by support members, be formed by the holders.

In a further development of the belt and tread drum according to the invention the first and/or second portions of the drum form inclined wedge planes, that cooperate with complementary wedge planes that are formed on the magnet holders and/or magnets, respectively. The wedge planes offer a simple and reliable confinement in radial outward direction and have a directional component that is radially oriented to the inside.

The holders are manufactured of steel, due to which the effectiveness of the magnets is enhanced.

From a further aspect the invention provides a belt and tread drum, particularly for shaping a belt layer and/or tread layer or another tyre component provided with metal parts into a circumferential whole, comprising one or more support members arranged at the circumference of the drum, which are provided with a support surface for the tyre component, wherein the support members are provided with magnet sets having magnets for by magnetically attracting the metal parts retaining the tyre component on the support surface and with holders for the magnets, wherein the drum at the outer side comprises confining portions that may form a unity with the support members, which confining portions confine the magnets and/or the holders in radial outward direction of the drum.

The holders themselves can also form such confining portions that engage over the magnets in tangential and/or axial direction of the drum.

The holders can be secured in the support members by means of glue applied from the radial inside.

In these cases it is also possible that the confining portions are formed by wedge planes that cooperate with wedge planes on the magnets and/or the holders.

In case the support surfaces at the location of the magnets are provided with a marking, the operator can easily see—even with the said continuous support surface—where the magnets are located in the drum and correctly arrange the tyre components.

From a further aspect the invention provides a belt and tread drum, particularly for shaping a belt layer and/or tread layer or another tyre component provided with metal parts into a circumferential whole, comprising one or more support members arranged at the circumference of the drum, which are provided with a support surface for the tyre component, wherein magnets are accommodated in the support members for by magnetically attracting the metal parts retaining the tyre component on the support surface, wherein the support members comprise portions that are formed as one unity with it that engage over the magnets in tangential and/or axial direction of the drum.

The magnets are accommodated in holders that may be placed from the radial inside in the support members, wherein the support members at the circumferential side comprise portions that engage over the holders and/or over the magnets in tangential and/or axial direction of the drum.

The said portions are also part of the support surfaces.

The invention furthermore provides a support member intended and suitable for use in a belt and tread drum according to the invention.

BRIEF DESCRIPTION OF THE DRAWINGS

The invention will be elucidated on the basis of an exemplary embodiment shown in the attached drawings, in which:

FIG. 1 shows a perspective view of a part of a belt and tread drum according to the invention, which for reasons of illustration includes several types of support surfaces according to the invention;

FIG. 2 shows a cross section of a first embodiment of a support member according to the invention;

FIG. 3 shows a cross-section of a second possible embodiment of a support member according to the invention;

FIG. 4 shows a view according to IV in FIG. 2; and

FIG. 5 shows a view according to V in FIG. 3.

DETAILED DESCRIPTION OF THE DRAWINGS

The belt and tread drum 1 shown in part in FIG. 1 has a support/drive shaft 2, which with means that are not further shown can be rotated very fast in the direction A. The drum surface 3 consists of segments, namely support members 4, in which magnets are accommodated. During the fast rotation of the drum 1, said magnets are able to retain tyre components (not shown) that have been arranged on the drum surface 3. This is known per se. The support members 4 are detachably attached to the drum 1.

Two possible support members 4a, 4b according to the invention are shown in FIGS. 2 and 4, and 3 and 5, respectively.

The support member 4a of FIG. 2 comprises an aluminium body 5a, which at the upper side as considered in the drawing, that is the radial outside of the drum, defines a closed surface. From the side B recesses formed in the aluminium body 5a are accessible, which recesses in fact form blind holes 40. In said recesses 40 a pair of steel trays 8a are accommodated, in which magnets 7a are attached with glue. The upper surface 6 of the magnets 7a is aligned with the upper surface of the tray 8a in question. A support surface 11a forming a unity with the aluminium body 5a extends over it. It can be seen that the magnets 7a and the trays 8a are confined to the outside by the aluminium material due to the aluminium thus continuing over them. P The trays 8a are fitted within steps 18a, 19a in the aluminium body 5a. Around it, from the inside B, a glue layer 9 is applied to secure the trays 8a in the aluminium body 5a, wherein the glue may extend up to the surfaces 12a, 13a of the steps 18a, 19a.

At the upper side elongated markings 20 are arranged in the support surface 11a, as can also bee seen in FIGS. 1 and 4.

In FIG. 4 the support member 4a is shown with holes 22 for mounting on the drum 3, and with holes 21 by which means an additional series of support members 4a can be attached on the already present support members 4a and can be removed from them again, if an increase/reduction of the diameter of the drum 3 is desired.

In the alternative embodiment of the support member 4b shown in FIGS. 3 and 5 the aluminium body 5b does not form blind holes, but through-holes. Holes are now limited at the location of the outer surface by shoulders 18b, 19b, that are provided with inclined planes 14, which inclined planes are able to cooperate with inclined planes 15 formed at the edges of the trays 8b. The trays 8b themselves are provided with slightly tapering walls 30, in between which the magnets 7b, shaped correspondingly inclined, have been inserted in longitudinal direction. The magnets 7b are thus stopped radially to the outside by wedge action, and the holders 8b are also stopped radially to the outside due to contact between the inclined planes 14 and 15.

Also in this case, the holders 8b with magnets 7b are inserted into the aluminium body 5b from the inside in the direction B, and subsequently secured with glue 9. A support member 4b as shown in FIG. 5 is for instance thus achieved, which in the same manner as support member 4a can be secured on the drum 1. In case of support members 4b the surface 6 of the magnet 7b will extend into the surface of the aluminium body 5b. No marking is necessary then, as can be seen in FIG. 1.

It will be understood that the invention of FIG. 2 can be supplemented by the way of confining a magnet according to FIG. 3.

Furthermore an embodiment is possible in which the aluminium body itself forms a wedge-shaped confinement for the magnets, and a step or wedge plane for the confinement of the holders for the magnets.

In FIG. 1 it is further shown that support members 4c and 4d comparable to support member 4a can be arranged on the drum 1, wherein the location of the magnets is shifted in shaft direction. This arrangement has to do with the diamond shape of the tyre components, wherein- there is question of a tapering leading end and a tapering trailing end. By means of the markings 20 the operator is able to correctly position the tapering leading end.

The invention claimed is:

1. A belt and tread drum, particularly for shaping a belt layer and/or a tread layer or another tire component provided with metal parts into a circumferential whole, comprising:

one or more support members, arranged at the circumference of the drum, and provided with a support surface for the tire component, each support member being provided with through-holes opening in the support surface, wherein the support members comprise magnet sets having magnets for retaining the tire component on the support surface by magnetically attracting the metal parts, wherein the magnet sets comprise holders for the magnets and are placed from the radial inside in the support members, wherein the drum at the circumferential side comprises first portions that engage over the holders in a tangential and/or axial direction of the drum, wherein the drum at the circumferential side comprises second portions that engage over the magnets in tangential and/or axial direction of the drum, the magnets having upper surfaces extending into the through-holes, said upper surfaces of the magnets being aligned with the support surface.

2. Belt and tread drum according to claim 1, wherein the first portions of the drum are part of the support surfaces.

3. Belt and tread drum according to claim 2, wherein the second portions of the drum are part of the support surfaces.

4. Belt and tread drum according to claim 1, wherein the upper surfaces of the magnets are part of the support surface for the tire component.

5. Belt and tread drum according to claim 1, wherein the support surfaces are formed as one unit with the support members.

6. Belt and tread drum according to claim 1, wherein the second portions of the drum are formed by the holders.

7. Belt and tread drum according to claim 1, wherein the first and/or second portions of the drum form inclined wedge planes that cooperate with complementary wedge planes that are formed on the magnet holders and/or magnets, respectively.

8. Belt and tread drum, according to claim 1, wherein the holders are tray-shaped.

9. Belt or tread drum according to claim 1, wherein the holders are manufactured of steel.

\* \* \* \* \*